United States Patent Office 3,462,530
Patented Aug. 19, 1969

---

3,462,530
S-CHLOROPHENOXY-METHYL, THIO, DITHIO PHOSPHONATES OR PHOSPHATES AS INSECTICIDES AND ACARICIDES
Karoly Szabo, Orinda, Calif., and John Gary Brady, West Chester, Pa., assignors to Stauffer Chemical Company, New York, N.Y., a corporation of Delaware
No Drawing. Original application June 12, 1964, Ser. No. 374,823, now Patent No. 3,368,002, dated Feb. 6, 1968. Divided and this application Dec. 13, 1967, Ser. No. 719,803
Int. Cl. A01m 9/36
U.S. Cl. 424—217    8 Claims

ABSTRACT OF THE DISCLOSURE

This invention relates to a method of killing insects and acarids with

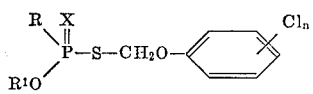

wherein R is selected from the group consisting of lower alkyl, lower alkoxy, chloro lower alkyl and phenyl, $R^1$ is a lower alkyl, X is selected from the group consisting of oxygen and sulfur, and $n$ is an integer from 1 to 3, inclusive.

---

This application is a division of copending application Ser. No. 374,823, filed June 12, 1964 now U.S. Patent No. 3,368,002.

This invention relates to certain novel chemical compounds and to the use of such compounds as insecticides and acaricides. The compounds are particularly valuable for their miticidal and pesticidal properties. These compounds have been found to be useful in the elimination and control of numerous insect pests as will be shown hereinafter.

More specifically, the invention relates to compounds of the formula

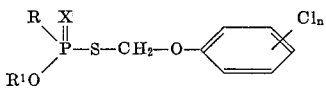

wherein R is selected from the group consisting of alkyl, alkoxy, haloalkyl and phenyl radicals, $R^1$ is a lower alkyl radical, X is selected from the group consisting of oxygen and sulfur, and $n$ is an integer from 1 to 3 inclusive.

The compounds of the present invention may be made according to the following general reaction.

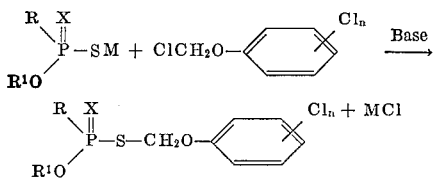

wherein R, $R^1$, X, and $n$ are defined as above, M is hydrogen or an alkali metal. When X is sulfur the reaction is preferably carried out in an inert solvent by mixing the appropriate chloromethyl substituted-phenyl ether and substituted-phosphonodithioic acid or its alkali metal salt in the presence of an organic base, such as triethylamine. When X is oxygen the substituted phosphonochlorido thioate starting material is first hydrolyzed to the phosphonothioic acid, then in the presence of the basic hydrolysis solution the substituted chloromethyl substituted-phenyl ether is added. The product in each case is recovered by extraction with an inert organic solvent and evaporation of the solvent. In the case where the by-product is an alkali metal halide, it may be removed by simply filtering prior to extraction.

The following examples illustrate the preparation of the compounds of the present invention in accordance with the above description.

EXAMPLE 1

Preparation of O-ethyl-S - (2,4,5 - trichlorophenoxymethyl)-ethylphosphonodithioate.—Chloromethyl - (2,4,5-trichlorophenyl)-ether (37.2 g.) and O-ethyl-ethylphosphonodithioic acid (25.5 g.) were dissolved in 130 ml. of benzene. Triethylamine (15.3 g.) was added dropwise to the vigorously stirred mixture. An exothermic reaction followed and the precipitation of the hydrochloride salt of triethylamine occurred. When the addition and the exothermic reaction were over the mixture was refluxed for an hour.

The mixture was allow to cool to ambient temperature and then filtered. The filtrate was washed with 300 ml. of 1% sodium hydroxide solution and water, subsequently. The organic layer was dried over magnesium sulfate and the solvent was removed to give a viscous yellow oil, which solidified on standing. After recrystallization from hexane a melting point of 73° C. was observed. A yield of 94% was obtained.

EXAMPLE 2

Preparation of O-ethyl-S-(2,4-dichlorophenoxymethyl)-ethylphosphonothioate.—In a reaction flask was placed 10.3 grams of O-ethyl-ethylphosphonochlorido thioate and 30 ml. of ethanol and 12 ml. of water. To the stirred mixture was added a solution of 6.7 grams of potassium hydroxide in 6 ml. of water. When the addition was completed the temperature was approximately 60° C. The mixture was heated to 70° C. for one hour. To the heated mixture was added 9.5 g. of 2,4-dichlorophenyl-chloromethyl ether and the reaction completed by refluxing the mixture for half an hour.

When the reaction mixture cooled to room temperature it was poured into 50 ml. of water. A colorless oil separated, which was drawn off and recovered. The aqueous portion was subsequently extracted with benzene. The organic layers were combined and dried over magnesium sulfate. The volatile material and solvents were removed by heating the mixture to 158° C. at 2 mm. pressure. A pale yellow oily product with a refractive index of 1,5533 at 25° C. was recovered and identified as the title compound.

Using the methods of the foregoing examples, the following additional compounds were prepared. Compound numbers have been assigned to each compound and are used hereinafter throughout the balance of the application for convenience.

TABLE I

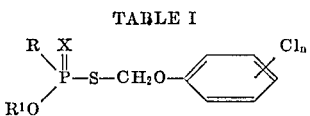

| Compound No. | R | R¹ | X | n | M.P. or $n_D^{25}$ |
|---|---|---|---|---|---|
| 1 [1] | $C_2H_5$ | $C_2H_5$ | S | 3 | 73° C. |
| 2 | $C_2H_5$ | $C_2H_5$ | S | 2 | 57° C. |
| 3 | $C_2H_5O$ | $C_2H_5$ | S | 3 | 1.5795 |
| 4 | $C_2H_5$ | $C_2H_5$ | S | 1 | 1.5776 |
| 5 | $C_2H_5O$ | $C_2H_5$ | S | 2 | 1.5678 |
| 6 | $C_2H_5$ | $CH_3$ | S | 2 | 47° C. |
| 7 [2] | $C_2H_5$ | $C_2H_5$ | O | 2 | 1.5533 |
| 8 | $ClCH_2$ | $C_2H_5$ | S | 2 | 1.5959 |
| 9 | $C_2H_5$ | $CH_3$ | O | 2 | 1.5602 |
| 10 | $C_2H_5O$ | $C_2H_5$ | O | 3 | 1.5520 |
| 11 | $C_2H_5O$ | $C_2H_5$ | O | 1 | 1.5283 |
| 12 | $CH_3O$ | $C_2H_5$ | S | 1 | 1.5665 |
| 13 | $C_2H_5$ | $n-C_3H_7$ | S | 1 | 1.5688 |
| 14 | $CH_3$ | $CH_3$ | S | 1 | 1.5958 |
| 15 | $CH_3$ | $CH_3$ | S | 2 | 1.6062 |
| 16 | $CH_3$ | $CH_3$ | S | 3 | 103° C. |
| 17 | $C_2H_5$ | $n-C_3H_7$ | S | 3 | 1.5873 |
| 18 | $C_2H_5$ | $n-C_3H_7$ | S | 2 | 1.5743 |
| 19 | $CH_3O$ | $C_2H_5$ | S | 2 | 1.5762 |
| 20 | $C_2H_5O$ | $C_2H_5$ | O | 2 | 1.5405 |
| 21 | $C_6H_5$ | $C_2H_5$ | O | 3 | 1.5905 |

[1] Compound No. 1 prepared in Example 1.
[2] Compound No. 7 prepared in Example 2.

The class of compounds characterized by the foregoing examples has been found to have valuable pesticidal properties. The following tests demonstrate some of the common insects on which the compounds were found active. The tests were conducted according to the following methods.

Insecticidal evaluation tests.—Four insect species were subjected to evaluation tests for insecticides:

(1) Housefly (HF)—*Musca domestica* (Linn.).
(2) American cockroach (AR)—*Periplaneta americana* (Linn.).
(3) German cockroach (GR)—*Blatella germanica* (Linn.).
(4) Salt-marsh caterpillar (SMC)—*Estigmene acrea* (Drury).

The test insects (AR) and (GR) were caged in cardboard mailing tubes with cellophane bottoms and coarse mesh nylon tops. Each cage was supplied with food and water. From ten to twenty-five insects were employed per cage. The caged insects were sprayed with the active candidate compounds at various concentrations. Dispersions of the test compounds were prepared by dissolving 0.10 gram of the toxic material in ten milliliters of acetone. This solution was then diluted with water containing 0.0175% v./v. of Sponto 221®, an emulsifying agent. The amount of water added was sufficient to give concentrations of active ingredient ranging from 0.10% to 0.001%. Final mortality readings were taken after seventy-two hours.

Housefly (HF) evaluation tests differed in the following manner. The toxicant was dissolved in a volatile solvent, preferably acetone, the active compound was pipetted into a petri dish bottom, allowed to air dry and then placed in a cardboard mailing tube. Twenty-five female flies, three to five days old, were caged in the tube. The flies are continuously exposed to the active residue of the active compound in the cage. Final mortality readings were taken forty-eight hours after initiation of the test. The $LD_{50}$ values were calculated using well known procedures.

Only certain compounds were selected for contact and stomach toxicity studies on the salt-marsh caterpillar. Several dilutions were made from a starting concentration of 0.1% and proceeding downward until the $LC_{50}$ value was reached. Dock leaves, approximately five inches long, were dipped in aqueous suspensions of the test materials for ten seconds. The leaves were then placed in one-pint containers with the stems projecting through small holes in the bottoms into vials containing water. Five 8 to 10-day old salt-marsh larvae were introduced and the container closed with a petri dish lid. Mortality readings were taken at twenty-four and seventy-two hours.

The results of the aforedescribed tests are listed in Table II.

TABLE II.—INSECTICIDAL ACTIVITY

| Compound No. | Insect | | | |
|---|---|---|---|---|
| | HF (μg.) | AR, percent | GR, percent | SMC, percent |
| 1 | 2.5 | .05 | | .003 |
| 2 | 10 | .01 | | .01 |
| 3 | 10 | .03 | | .008 |
| 4 | 10 | .03 | | .03 |
| 5 | 30 | | | .01 |
| 6 | 8 | .03 | | |
| 7 | 1 | .1 | | .01 |
| 8 | 50 | | | |
| 9 | 3 | .07 | | .01 |
| 10 | 25 | | | |
| 11 | 10 | | | |
| 12 | 10 | | | |
| 13 | 5 | | .05 | |
| 14 | 10 | | .03 | |
| 15 | 8 | | .005 | |
| 16 | 25 | | .1 | |
| 17 | 25 | | | |
| 18 | | | | |
| 19 | 8 | | .05 | |
| 20 | 5 | | | |
| 21 | 25 | | | |

Acaricidal evaluation test.—The two-spotted mite, *Tetranychus telarius* (Linn.) was employed in tests for acaricidal activity. Young pinto bean plants were infested with several hundred mites. Dispersions of test compounds were prepared by dissolving 0.10 gram of the candidate in ten milliliters of acetone. This solution was then diluted with water containing 0.0175% v./v. of Sponto 221®, an emulsifying agent. The amount of water was sufficient to give concentrations of active ingredient ranging from 0.10% to 0.001%. The test suspensions were sprayed on the infested pinto bean plants. After seven and fourteen days the plants were examined both for post-embryonic forms of the mite as well as for eggs. The percentage of kill was determined by comparison with control plants which had not been sprayed and the $LC_{50}$ value was calculated using well-known procedures. $LC_{50}$ values are reported under the columns "Two-Spotted Mite" in the following table; "PE" indicates post-embryonic forms while "E" indicates eggs.

TABLE III.—MITICIDAL ACTIVITY

| Compound No. | Two-spotted mite, percent | |
|---|---|---|
| | PE | E |
| 1 | .03 | .03 |
| 2 | .003 | .003 |
| 3 | .1 | .1 |
| 4 | .008 | 0.3 |
| 5 | .001 | |
| 6 | .03 | |
| 7 | .008 | .08 |
| 8 | .01 | .08 |
| 9 | .01 | .03 |
| 10 | .05 | |
| 11 | .03 | |
| 12 | .05 | |
| 13 | .005 | .005 |
| 14 | .01 | .03 |
| 15 | .01 | .03 |
| 16 | .008 | |
| 17 | .03 | |
| 18 | .008 | .01 |
| 19 | .03 | |
| 20 | .05 | |
| 21 | .01 | .01 |

The compounds of the present invention may be applied to a pest habitat in ways well known to those skilled in the art, such as dusts, sprays of solutions or dispersions and the like.

We claim:

1. The method of killing pests selected from the group consisting of insects and acarids comprising applying to the habitat of said pest an effective pesticidal amount of a compound of the formula

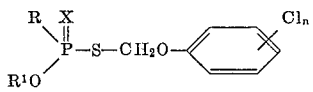

wherein R is selected from the group consisting of lower alkyl, lower alkoxy, chloroloweralkyl and phenyl, $R^1$ is a lower alkyl radical, X is selected from the group consisting of oxygen and sulfur, and $n$ is an integer from 1 to 3, inclusive.

2. The method of killing pests selected from the group consisting of insects and acarids comprising applying to the habitat of said pest an effective pesticidal amount of the compound O-ethyl-S-(2,4,5-trichlorophenoxymethyl)-ethylphosphonodithioate.

3. The method of killing pests selected from the group consisting of insects and acarids comprising applying to the habitat of said pest an effective pesticidal amount of the compound O-ethyl-S-(2,4-dichlorophenoxymethyl)-ethylphosphonodithioate.

4. The method of killing pests selected from the group consisting of insects and acarids comprising applying to the habitat of said pest and effective pesticidal amount of the compound O - propyl-S-(4-chlorophenoxymethyl)-ethylphosphonodithioate.

5. The method of killing pests selected from the group consisting of insects and acarids comprising applying to the habitat of said pest an effective pesticidal amount of the compound O-ethyl-S-(2,4-dichlorophenoxymethyl)-ethylphosphonothioate.

6. The method of killing pests selected from the group consisting of insects and acarids comprising applying to the habitat of said pest an effective pesticidal amount of the compound O-ethyl-S-(2,4,5-trichlorophenoxymethyl)-phenylphosphonodithioate.

7. The method of killing pests selected from the group consisting of insects and acarids comprising applying to the habitat of said pest an effective pesticidal amount of the compound O,O-diethyl-S-(4-chlorophenoxymethyl)-phosphorothioate.

8. The method of killing pests selected from the group consisting of insects and acarids comprising applying to the habitat of said pest an effective pesticidal amount of the compound O-methyl-S-(2,4-dichlorophenoxymethyl)-methylphosphonodithioate.

References Cited

UNITED STATES PATENTS

| | | |
|---|---|---|
| 2,586,655 | 2/1952 | Hook et al. |
| 2,597,534 | 5/1952 | Schrader. |
| 2,793,224 | 5/1957 | Fancher. |
| 2,891,984 | 7/1959 | Gätzi. |
| 2,976,312 | 3/1961 | Schrader. |
| 2,992,265 | 7/1961 | Schrader. |
| 3,025,316 | 3/1962 | Lorenz et al. |
| 3,274,299 | 9/1966 | Walsh et al. |
| 3,357,882 | 12/1967 | Scheinpflug et al. |
| 3,368,002 | 2/1968 | Szabo et al. |

ALBERT T. MEYERS, Primary Examiner

J. D. GOLDBERG, Assistant Examiner